(12) United States Patent
Koga et al.

(10) Patent No.: US 7,233,994 B1
(45) Date of Patent: Jun. 19, 2007

(54) NETWORK CONNECTION APPARATUS

(75) Inventors: Naoki Koga, Fukuoka (JP); Naoya Imahashi, Fukuoka (JP); Souichi Kawata, Fukuoka (JP); Mitsuhiro Koba, Fukuoka (JP); Tomiya Miyazaki, Fukuoka (JP); Tetsuya Tobeta, Fukuoka (JP); Hideyuki Furukawa, Fukuoka (JP); Shoichiro Kikuchi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 713 days.

(21) Appl. No.: 09/703,802

(22) Filed: Nov. 2, 2000

(30) Foreign Application Priority Data

| Nov. 2, 1999 | (JP) | ................................. 11-311990 |
| Nov. 4, 1999 | (JP) | ................................. 11-313415 |
| Dec. 3, 1999 | (JP) | ................................. 11-344501 |

(51) Int. Cl.
*G06F 15/16* (2006.01)
*G06F 15/173* (2006.01)

(52) U.S. Cl. ...................... 709/227; 709/249; 709/250

(58) Field of Classification Search ............... 709/250, 709/239, 201, 202, 203, 227, 229, 220, 249; 345/91, 82; 370/357, 352, 328; 707/511
See application file for complete search history.

(56) References Cited

U.S. PATENT DOCUMENTS

| 5,061,845 | A | * | 10/1991 | Pinnavaia .................... 235/492 |
| 5,483,640 | A |   | 1/1996 | Isfeld et al. |
| 5,559,501 | A | * | 9/1996 | Barzegar et al. ............. 340/825 |
| 5,768,147 | A |   | 6/1998 | Young |
| 5,771,468 | A | * | 6/1998 | Stein ........................... 455/561 |
| 5,905,476 | A | * | 5/1999 | McLaughlin et al. ........ 345/781 |
| 6,229,507 | B1 | * | 5/2001 | Nakamura et al. ............. 345/82 |
| 6,421,735 | B1 | * | 7/2002 | Jung et al. .................... 709/250 |
| 6,505,255 | B1 | * | 1/2003 | Akatsu et al. ............... 709/239 |
| 6,584,096 | B1 | * | 6/2003 | Allan .......................... 370/352 |
| 6,608,830 | B1 | * | 8/2003 | Hirano et al. ................ 370/351 |
| 6,681,259 | B1 | * | 1/2004 | Lemilainen et al. ......... 709/250 |
| 6,816,480 | B1 | * | 11/2004 | Monroe et al. .............. 370/328 |
| 7,027,416 | B1 | * | 4/2006 | Kriz ............................ 370/328 |
| 7,099,295 | B1 | * | 8/2006 | Doyle et al. ................. 370/338 |

(Continued)

FOREIGN PATENT DOCUMENTS

EP 0 483 547 A1 5/1992

(Continued)

*Primary Examiner*—Paul H. Kang
(74) *Attorney, Agent, or Firm*—McDermott Will & Emery LLP

(57) ABSTRACT

The present invention relates to a network connection apparatus for connecting a plurality of network terminals to an external network such as the Internet. In accordance with the present invention, there provides an easy-to-use network connection apparatus capable of building up an easy and flexible network system by providing the user with plurality types of interface. Specifically, the network connection apparatus comprises a first interface unit including at least one physical layer for connecting to an external network, a second interface unit including a plurality of physical layers for connecting to an internal network, and a controller for controlling the first interface unit and the second interface unit, wherein the second interface unit is capable of independent operation from the first interface unit, and the controller transmits and receives information between the first interface unit and second interface unit, and between the second interface units.

6 Claims, 22 Drawing Sheets

U.S. PATENT DOCUMENTS 7,130,612 B1 * 10/2006 Blewett et al. .............. 455/406
2001/0011284 A1 * 8/2001 Humpleman et al. ....... 707/511

FOREIGN PATENT DOCUMENTS

| JP | 9-168007 | 6/1997 |
| JP | 10-1998-17813 | 5/1998 |
| JP | 11-55355 | 2/1999 |
| JP | 11-103331 | 4/1999 |
| JP | 11-163967 | 6/1999 |
| WO | WO 99/09488 | 2/1999 |

* cited by examiner

NETWORK CONNECTION APPARATUS

BACKGROUND OF THE INVENTION

1. Field of the Invention

The present invention relates to a network connection apparatus for connecting a plurality of network terminals to an external network such as the Internet.

2. Description of the Related Art

Recently, along with the rapid spread of the Internet, there is a mounting need for connecting plural personal computers (PCs) at home or in small office to the Internet in batch.

FIG. 22 is a block diagram of a conventional network system, assuming a small office. Operation of the conventional network system when a PC 304a sends an electronic mail (E-mail) to outside is explained. The E-mail from the PC 304a is transmitted to the Internet 301 through a router 302. At this time, if a PC 304b attempts to access the Internet, transmission is allowed when Ethernet 303, a transmission line, is free. However, while the line is busy as being used by the PC 304a, it is required to wait until free. When it is confirmed that the line is free, access to the Internet, an external network, is started.

Herein, information is transmitted and received by the so-called CSMA/CD (carrier sense multiple access/collision detect) system.

The clients, PC304a, 304b, 304c, can access the Internet at the same time, but the transmission speed is slower than when one unit accesses.

On the other hand, at home, plural information appliances such as AV apparatus, telephone, and facsimile equipment are used independently, and they are desired to be combined into a network.

However, in particular, if attempted to centralize plural PCs at home and connect to an external network, it is difficult to connect Ethernet wiring at home, and an easier and more flexible network system is needed.

SUMMARY OF THE INVENTION

The invention is intended to solve the problems of the prior art, and it is an object thereof to present an easy-to-use network connection apparatus capable of building up an easy and flexible network system by providing the user with plural types of interface.

To achieve the object, the network connection apparatus of the invention comprises a first interface unit including at least one physical layer for connecting to an external network, a second interface unit including plural physical layers for connecting to an internal network, and a controller for controlling the first interface unit and second interface unit. The controller transmits and receives information between the first interface unit and second interface unit, and between the second interface units.

DESCRIPTION OF THE PREFERRED EMBODIMENTS

Figure 1:
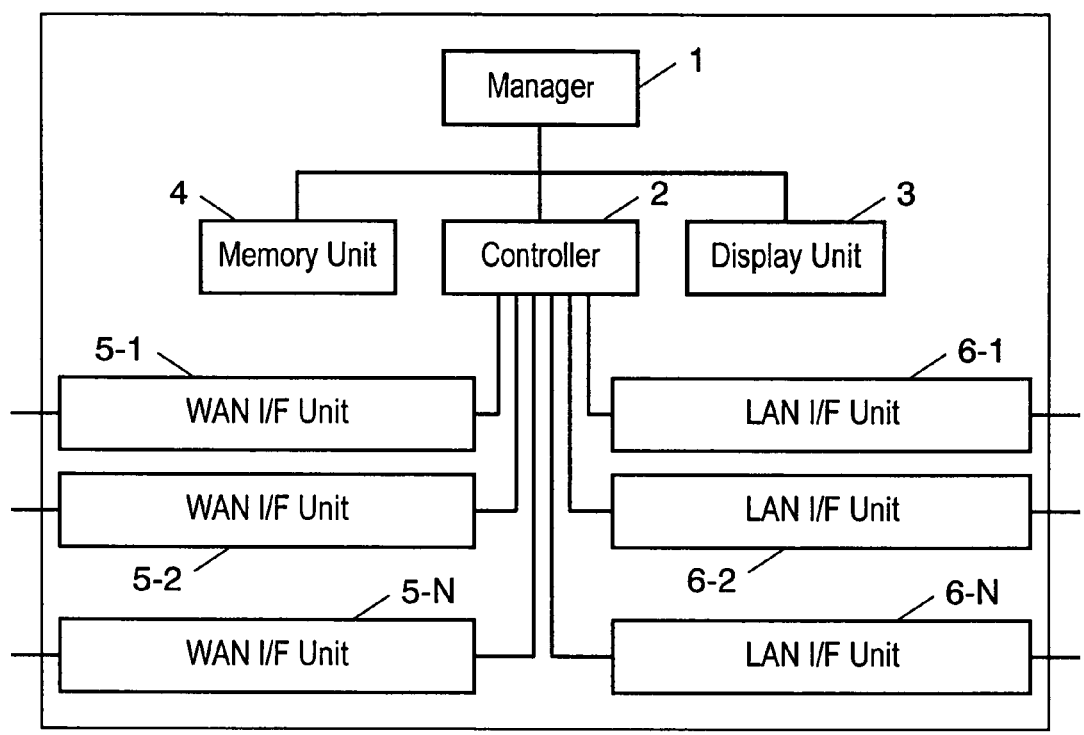
FIG. 1 is a block diagram of a network connection apparatus in embodiment 1 of the invention.

Referring now to the drawings, preferred embodiments of the invention are described in detail below.

Embodiment 1

FIG. 1 is a block diagram of a network connection apparatus in a first embodiment of the invention.

As shown in FIG. 1, the network connection apparatus of this embodiment comprises a manager 1, a controller 2, a display unit 3, a memory unit 4, wide area network (WAN) interface (I/F) units 5-1 to 5-N for connecting to an external network, and LAN I/F units 6-1 to 6-N for connecting to an internal network.

The display unit 3 is composed of LCD, LED or other display device, and lights up corresponding to the operating state of the interface unit. The memory unit 4 is composed of semiconductor memory, magnetic memory, or optical memory.

The WAN I/F units 5-1 to 5-N are composed of plural types of physical layers. The LAN I/F units 6-1 to 6-N are also composed of plural types of physical layers. The physical layers are selected from the Ethernet, telephone line, optical fiber, coaxial cable, powerline, and wireless means, and are applied in each I/F unit. In the case of wireless means, radio wave or infrared ray is used.

Data transmitted from the terminals connected to the LAN I/F units 6-1 to 6-N are transmitted to the external network through the WAN I/F units 5-1 to 5-N. To the contrary, data from the external network received through the WAN I/F units 5-1 to 5-N arrive at the terminals connected to the LAN I/F units 6-1 to 6-N. At this time, the controller 2 has a routing function, and converts the protocol or converts the address.

For example, data can be exchanged between the client connected to the LAN I/F unit 6-1 and the client connected to the LAN I/F unit 6-N. In this case, the physical layer of the LAN I/F unit 6-1 and the physical layer of the 6-N may be either same or different. In the case of the same physical layers, the controller 2 functions also as the hub. If the physical layers are different, the controller 2 functions as the bridge.

If the transmission speed is different, missing or other defect of information is eliminated by using a buffer memory or the like when transmitting or receiving the information, so that the system can be used without any sense of strangeness.

Embodiment 2

Figure 2:
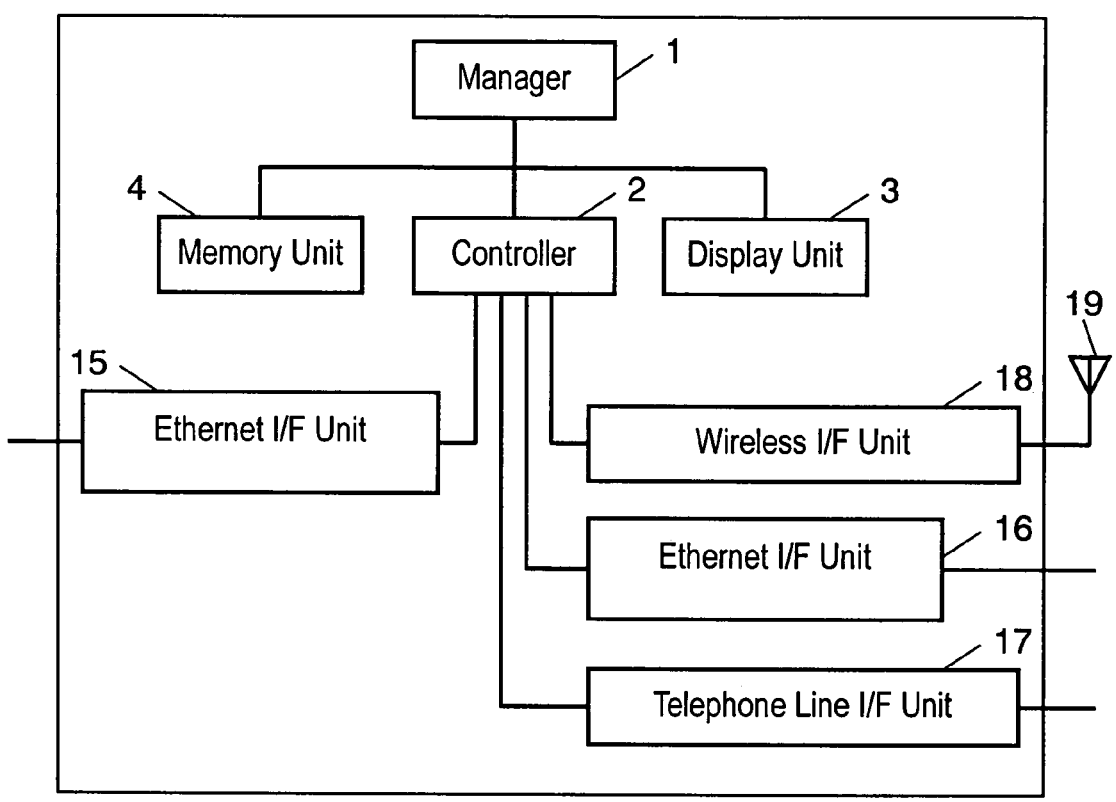
FIG. 2 is a block diagram of a network connection apparatus in embodiment 2 of the invention.

FIG. 2 is a block diagram of a network connection apparatus in embodiment 2 of the invention. In FIG. 2, same blocks and same functions as in FIG. 1 are identified with same reference numerals.

The physical layer of an Ethernet I/F unit 15 which is a WAN I/F unit is Ethernet. By using an Ethernet interface, for example, the device to be connected can be used freely, such as cable modem or ADSL modem. Physical layers of wireless I/F unit 18, Ethernet I/F unit 16, and telephone line I/F unit 17, which are LAN I/F units, are respectively wireless means, Ethernet, and telephone line. The data transmission speed of each LAN I/F unit is not slower than the Ethernet transmission speed of 10 Mbps. Hence, data can be exchanged among the interfaces without delay of data. Accordingly, this embodiment is very effective for transmission of isochronous data such as moving image and audio data.

Figure 9:
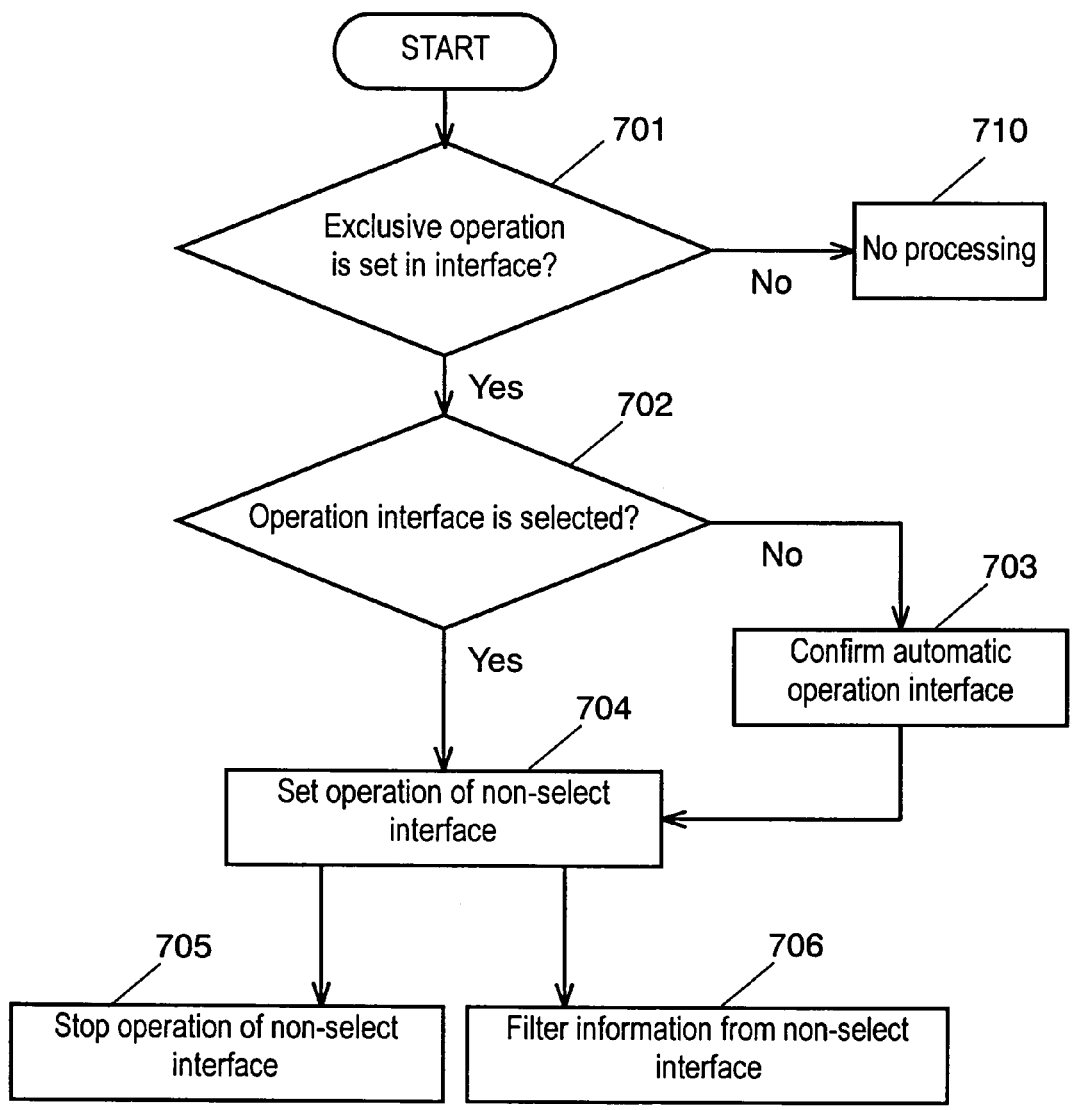
FIG. 9 is a flowchart of the network connection apparatus in embodiment 2 of the invention.

FIG. 9 is a flowchart of the network connection apparatus in embodiment 2 of the invention.

The flowchart in FIG. 9 is explained below.

<Step 701>

Check if exclusive operation of I/F unit is set or not. If set, go to step 702.

<Step 702>

Check if operation I/F unit is selected or not. If selected, go to step 704. If not selected, go to step 703.

<Step 703>

Check automatic operation I/F unit, and go to step 704.

<Step 704>

Set operation of non-select I/F unit.

Two types of operation setting are prepared. In one, go to step 705, and stop operation of non-select I/F. In other, go to step 706, and filter information from non-select I/F.

As mentioned above, of all LAN I/F units, the I/F unit in which data is actually flowing is detected, or the I/F unit to pass data in is designated, and therefore only the I/F unit in which data is actually flowing is controlled by the controller 2. In this manner, the processing load is lessened, and the data transfer efficiency is enhanced.

In the invention, the LAN I/F units are not limited to only this embodiment, and the types and number of physical layers of the I/F units are not specified.

Embodiment 3

Figure 3:
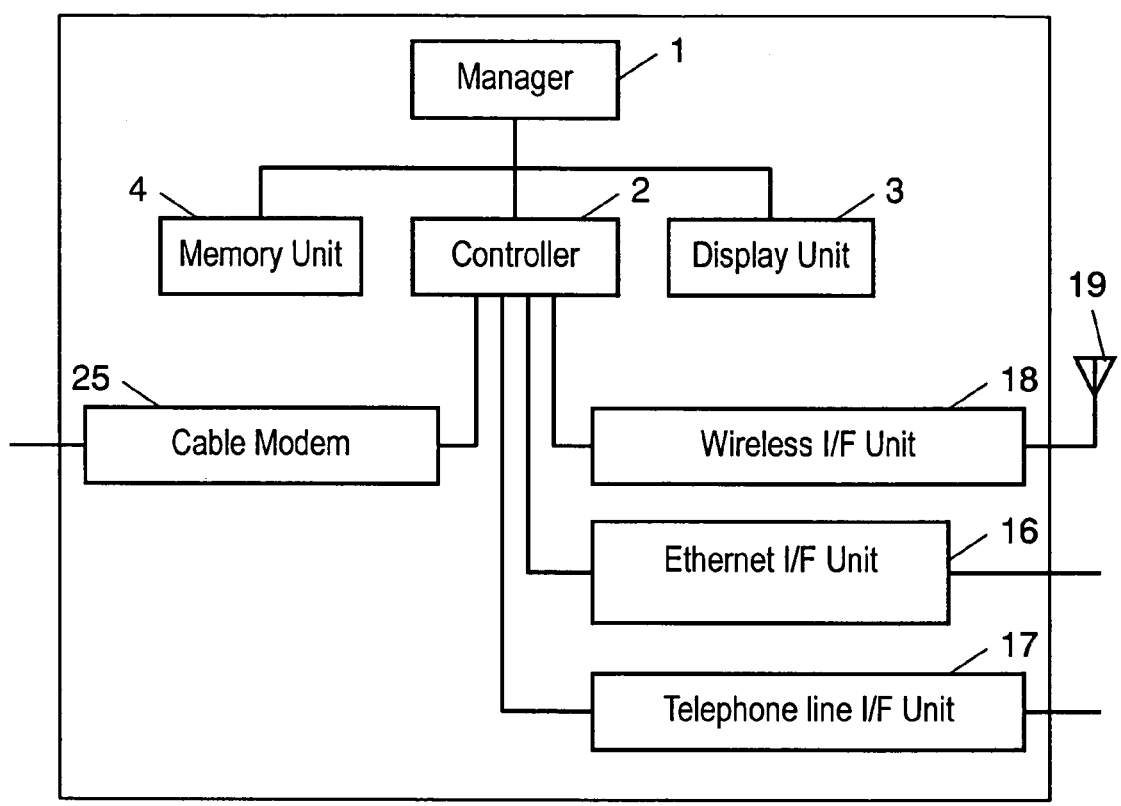
FIG. 3 is a block diagram of a network connection apparatus in embodiment 3 of the invention.

FIG. 3 is a block diagram of a network connection apparatus in embodiment 3 of the invention. In FIG. 3, same blocks and same functions as in FIG. 2 are identified with same reference numerals.

A WAN I/F unit 25 incorporates a cable modem, and employs a coaxial cable I/F for CATV.

By incorporating the cable modem, the device to be connected to the WAN I/F unit is limited, but only the network connection apparatus of the invention may be installed. Besides, since the dial-up device for Internet connection is not required, the ease of installation is enhanced.

Moreover, by incorporating the function of set-top box for CATV and cable modem, the ease of installation is further enhanced.

By incorporating the ADSL modem, instead of the cable modem, the telephone line I/F can be also achieved.

In the invention, the LAN I/F units are not limited to only this embodiment, and the types and number of physical layers of the I/F units are not specified.

Embodiment 4

Figure 4:
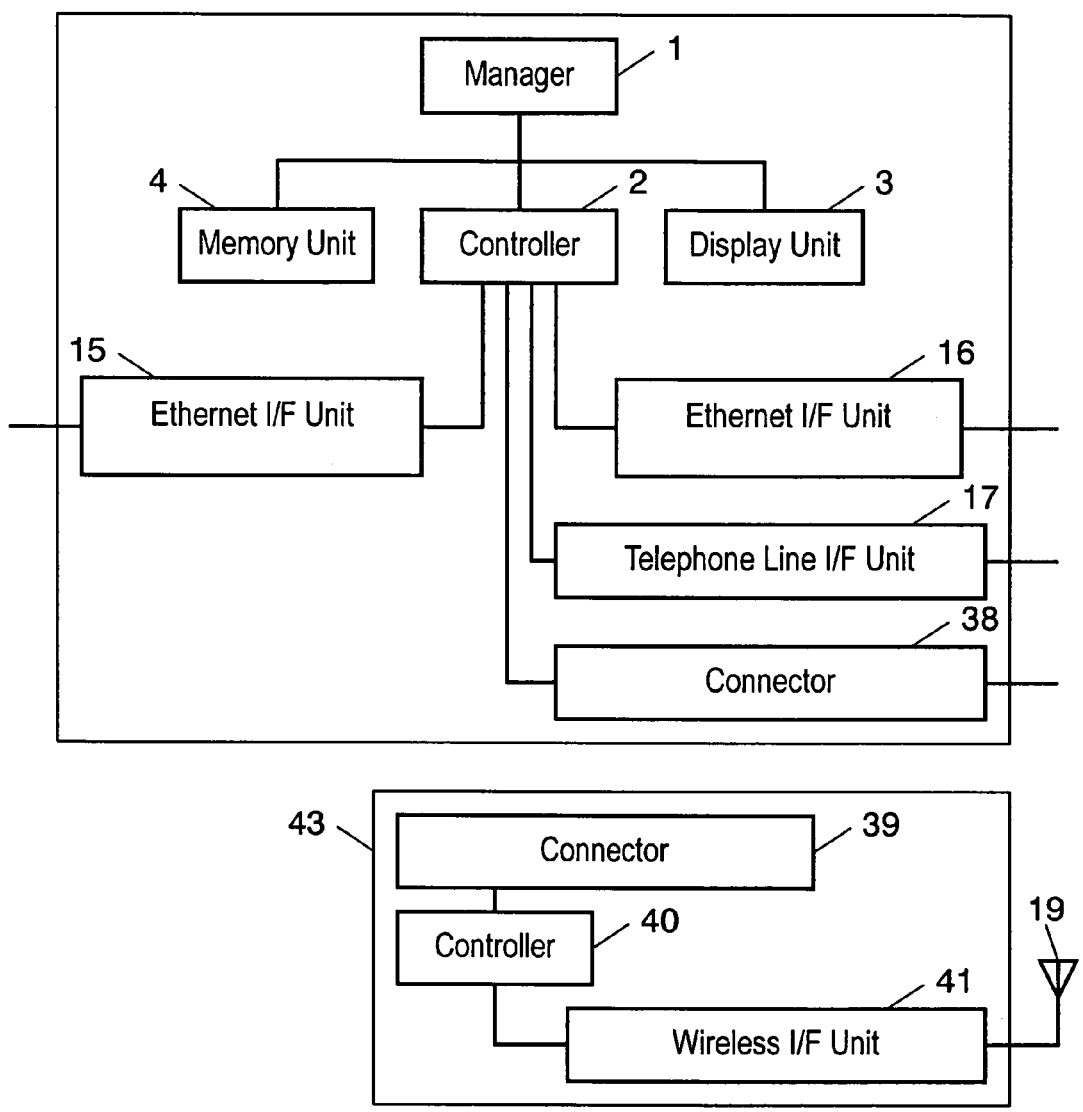
FIG. 4 is a block diagram of a network connection apparatus in embodiment 4 of the invention.

FIG. 4 is a block diagram of a network connection apparatus in embodiment 4 of the invention. In FIG. 4, same blocks and same functions as in FIG. 2 are identified with same reference numerals.

A module controller 40, a wireless I/F unit 41, and a connector 39 compose a modular wireless LAN unit 43.

In this embodiment, the LAN I/F is modularized in part or in whole, and is easy to attach and detach. For example, a detachable wireless LAN unit 43 is shown in FIG. 4. Since the LAN unit is detachable, if the I/F necessary for connection of various information appliances at home is not complete from the beginning, it can be prepared later, and the flexible use is realized.

Besides, the necessary LAN I/F unit can be selected, and the expensive wireless LAN unit 43 may be omitted because it is an optional I/F, so that the cost of the main body of the network connection apparatus can be saved. For example, by using the connectors 38, 39 conforming to the PC card standard (PCMCIA standard), the modular wireless LAN unit 43 may be realized by a device having a PC card slot, for example, a laptop computer, so that the versatility is improved.

Further, as in the embodiment, by installing a controller 40 also at the wireless LAN unit 43 side, the processing load can be distributed. Hence, the processing load of the controller 2 can be lowered.

Figure 7:
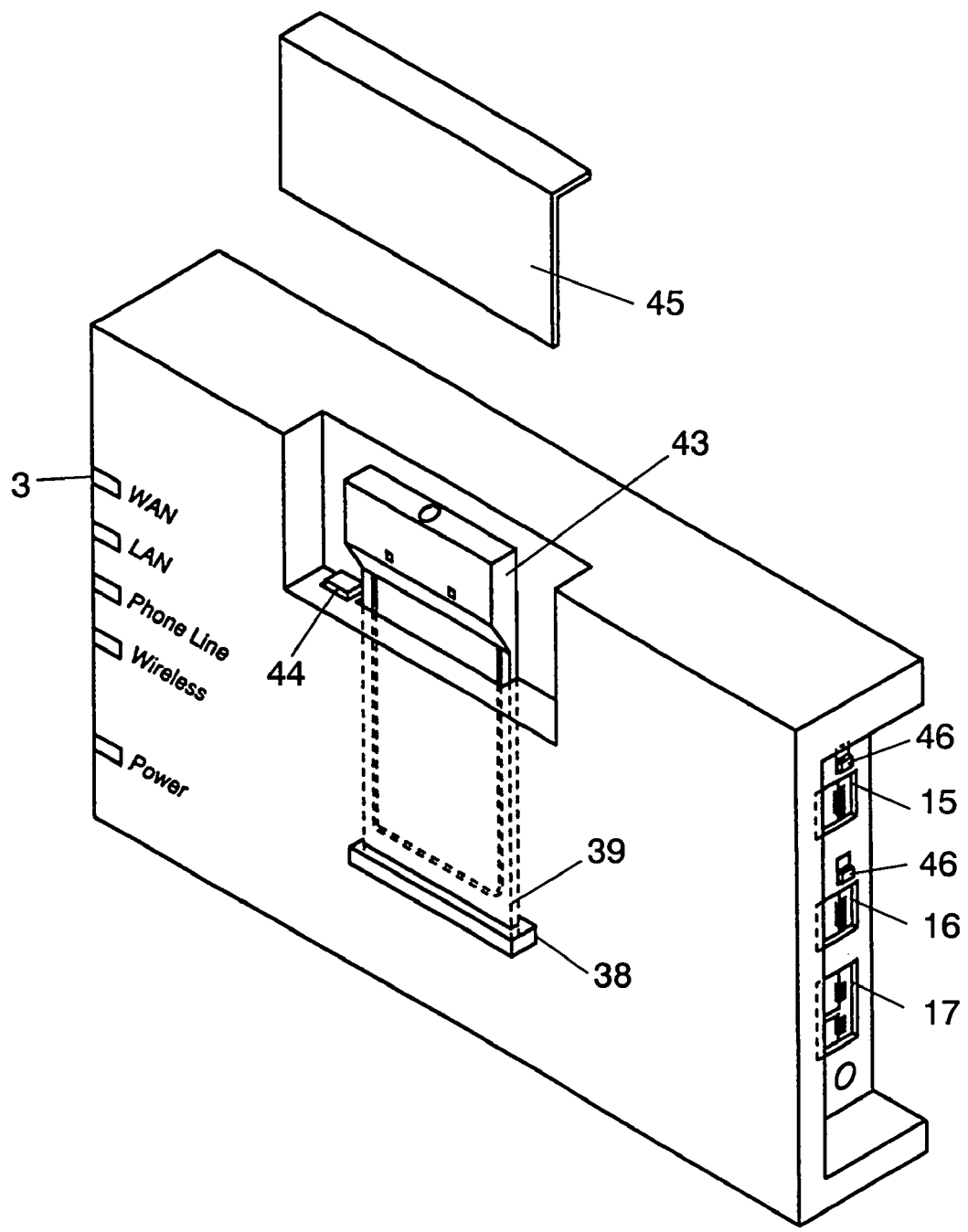
FIG. 7 is an appearance drawing of the network connection apparatus in embodiment 4 of the invention.

FIG. 7 is an appearance drawing of the network connection apparatus in embodiment 4 of the invention. In the diagram, those corresponding to the parts in FIG. 4 are identified with same reference numerals, and their description is omitted.

An eject button 44 is for ejecting the wireless LAN unit 43. A lid 45 covers the wireless LAN unit 44 installed in the main body. A changeover switch 46 changes over the PC or hub connected to the Ethernet I/F. Generally, depending on the device at the destination of connection, the user must selectively use either the straight cable or the cross cable, but the same cable can be used by means of the changeover switch 46.

If the user wishes to connect in the transmission-reception relation such as direct connection of the terminal and the network connection apparatus, the changeover switch 46 is connected to the "cross" side. Or when connecting the network connection apparatus to the hub, the changeover switch 46 is connected to the "straight" side, so that it is not required to prepare cross type and straight type cables, and it is convenient for the user.

The display unit 3 is designed to flicker during operation of each I/F. As shown in FIG. 7, all other I/Fs than the I/F for the optional wireless LAN unit 43 are disposed at one side of the network connection apparatus. This is considered for the ease of bundling the connection wires used in the network, so as not to disturb the connection wires used in the network, assuming the environment of use at home or small office.

A lid 45 for cover of the wireless LAN unit is provided to avoid unexpected impact on the wireless LAN unit 43.

Figure 8:
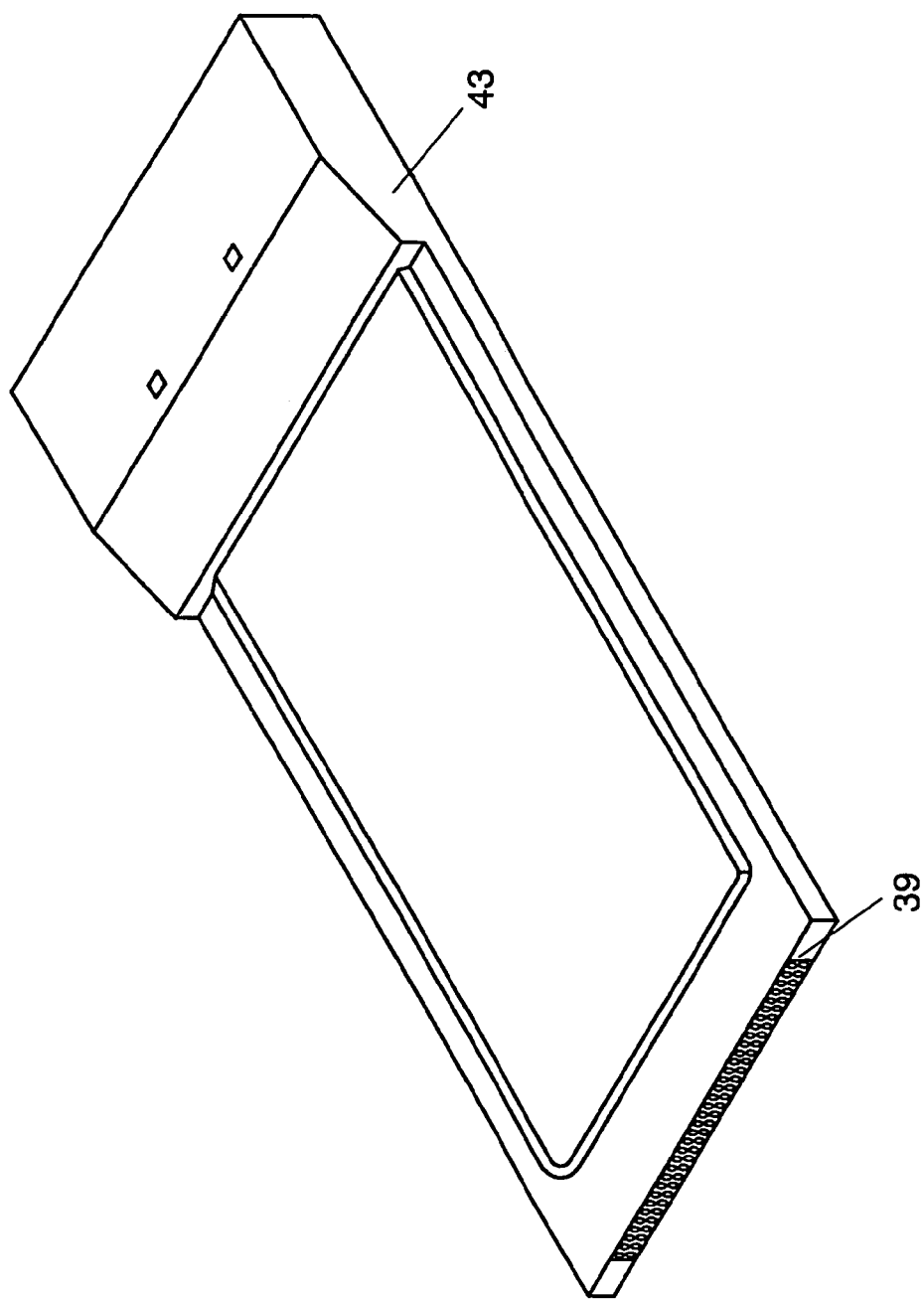
FIG. 8 is an appearance drawing of wireless LAN unit to be connected to the network connection apparatus in embodiment 4 of the invention.

FIG. 8 is an appearance drawing of the wireless LAN unit used in the network connection apparatus in embodiment 4 of the invention. The modular wireless LAN unit 43 has a connector 39 conforming to the PC card standard. Hence, it can be used by other device having PC card slot, than the network connection apparatus of the invention, such as a laptop computer, so that the versatility is further enhanced.

In a different structure, the controller 40 may be omitted in the wireless LAN unit 43.

In the invention, the LAN I/Fs are not limited to only this embodiment, and the types and number of physical layers of the I/Fs are not specified.

Embodiment 5

Figure 5:
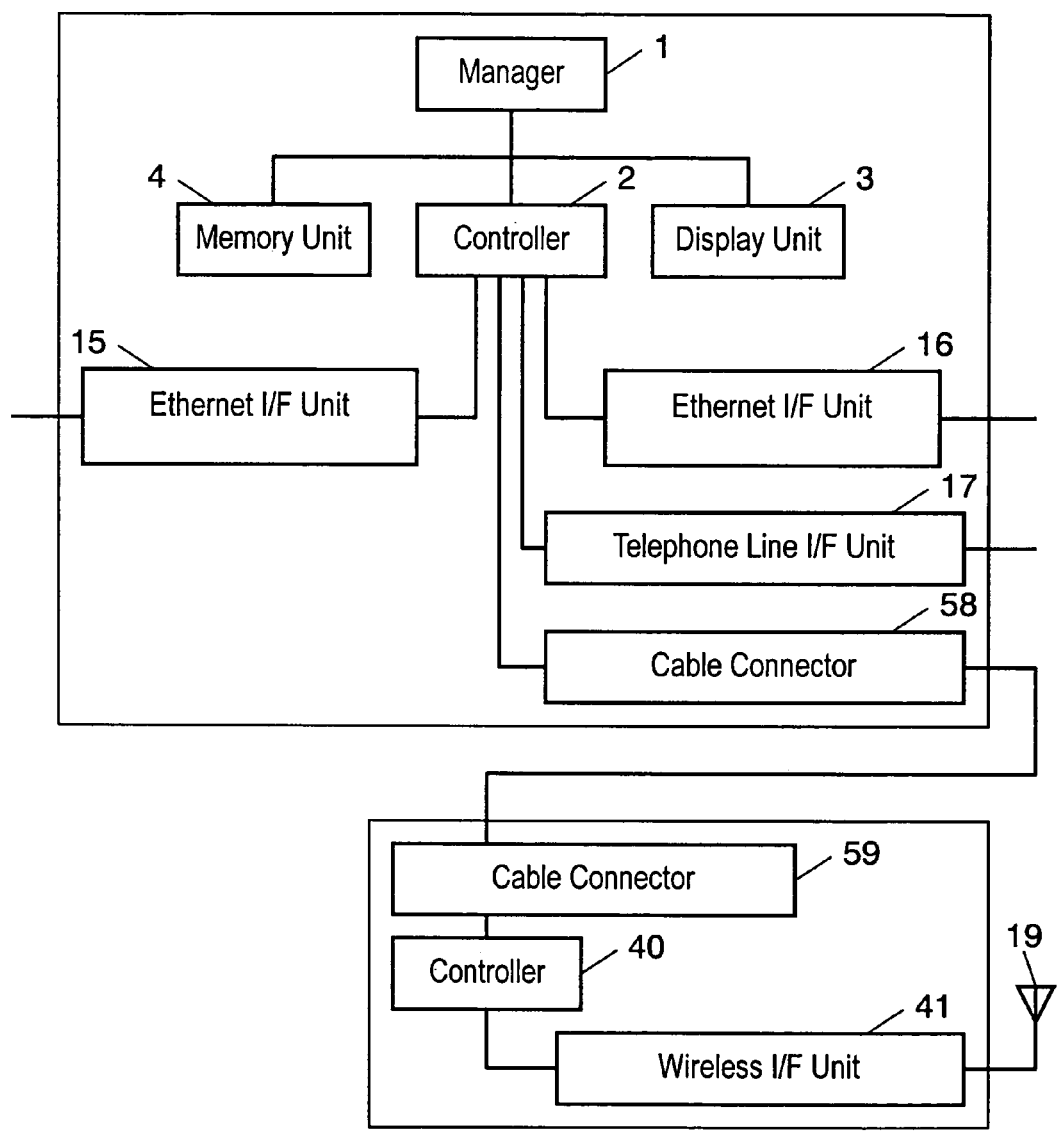
FIG. 5 is a block diagram of a network connection apparatus in embodiment 5 of the invention.

FIG. 5 is a block diagram of a network connection apparatus in embodiment 5 of the invention. In FIG. 5, same blocks and same functions as in FIG. 4 are identified with same reference numerals. In this embodiment, the wireless LAN unit 43 is connected to the main body by means of cable. For this purpose, a cable connector 58 and a cable connector 59 are provided respectively at the main body side and the wireless LAN unit side.

Hence, the wireless I/F 41 can be separated from the main body, and there is a degree of freedom in its installation. On the radio waves propagating in the air, in order to minimize the effects from obstacles, it is preferred to install the wireless unit in a free space, which is realized in the embodiment.

The degree of freedom of installation may be further enhanced by separating the antenna 19 from the wireless LAN unit, or by installing other antenna.

In the invention, the LAN I/F units are not limited to only this embodiment, and the types and number of physical layers of the I/F units are not specified.

Embodiment 6

Figure 6:
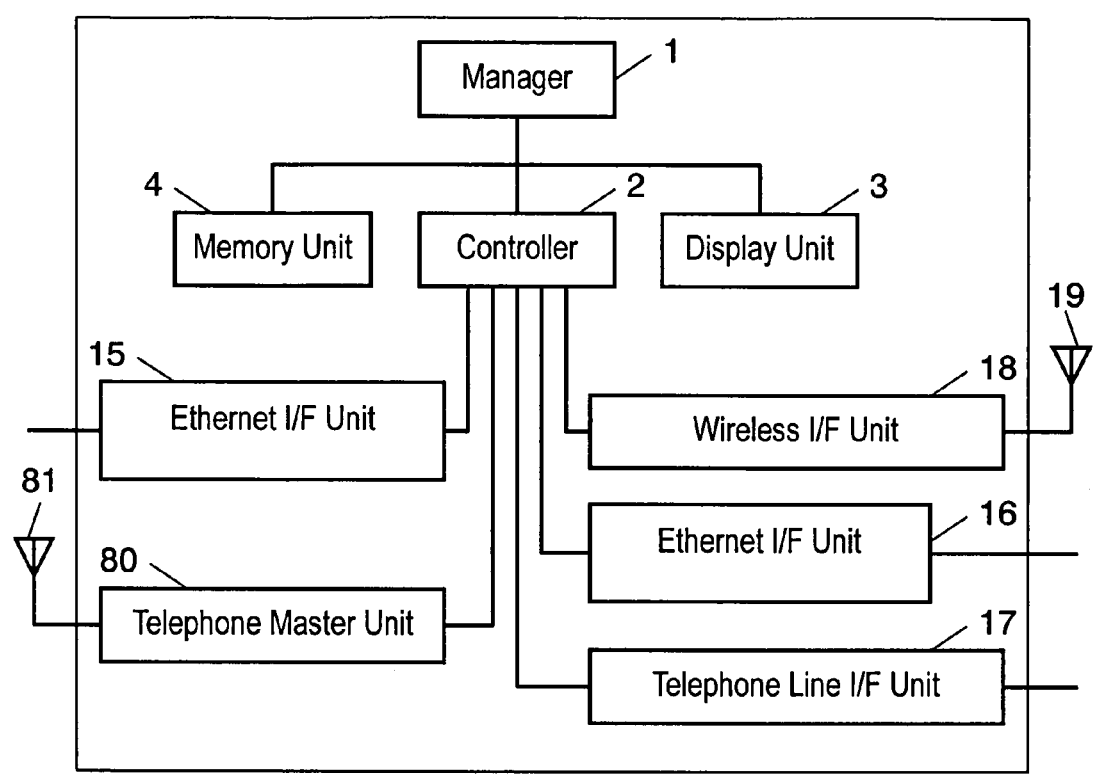
FIG. 6 is a block diagram of a network connection apparatus in embodiment 6 of the invention.

FIG. 6 is a block diagram of a network connection apparatus in embodiment 6 of the invention. In FIG. 6, same blocks and same functions as in FIG. 2 are identified with same reference numerals. In addition to the structure in FIG. 2, a master unit 80 of a cordless telephone having an antenna 81 is further provided.

In this embodiment, the data and audio can be processed by integrating. In the case the WAN I/F is an Ethernet I/F for transmitting data, the audio signal is once A/D converted, and is converted into a packet so as to be passed into the Ethernet, and processed same as the data, so that the function of the Internet telephone (LAN telephone) is realized.

Or, when the WAN I/F unit has a telephone line, the audio signal can be transmitted and received in the WAN I/F unit directly as analog signal.

Besides, the wireless I/F unit and wireless unit may be shared, or the antenna unit may be shared.

Further having the facsimile function and others, it is very useful as the network connection apparatus for home and small office for transmitting and receiving information.

The user can build up simple and flexible network system only by installing the network connection apparatus of the invention.

In the invention, the LAN I/F units are not limited to only this embodiment, and the types and number of physical layers of the I/F units are not specified.

Embodiment 7

Figure 10:
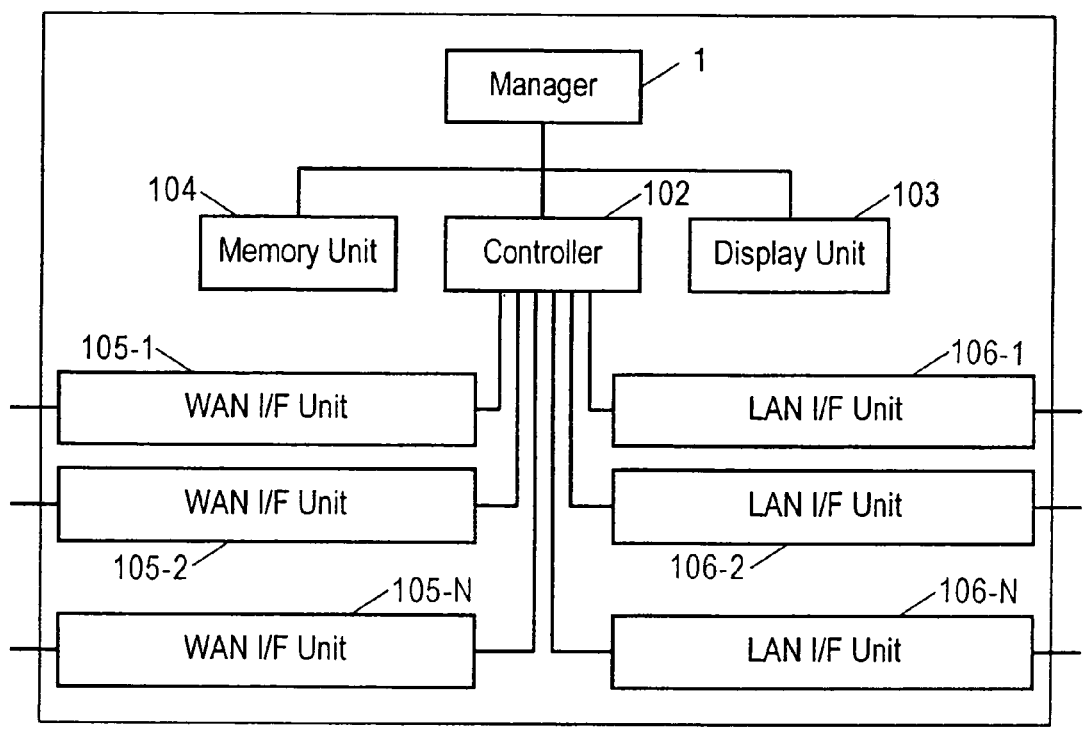
FIG. 10 is a block diagram of a network connection apparatus in embodiment 7 of the invention.

FIG. 10 is a block diagram of a network connection apparatus in embodiment 7 of the invention. The block structure in FIG. 10 is same as in FIG. 1, and its description is omitted.

Figure 11:
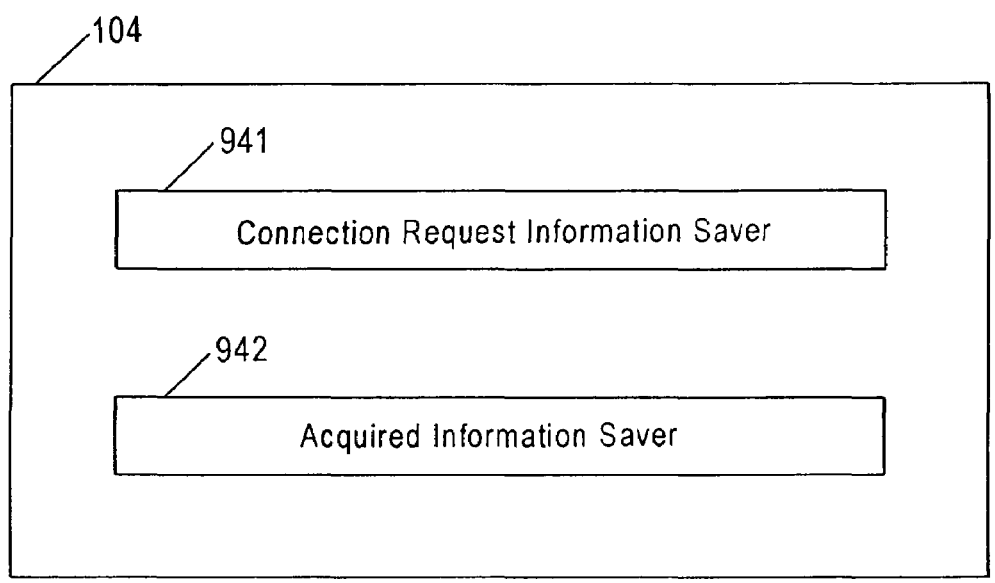
FIG. 11 is a block diagram of memory unit of the network connection apparatus in embodiment 7 of the invention.

FIG. 11 is a block diagram of a memory unit 104 of the network connection apparatus in embodiment 7 of the invention.

The memory unit 104 is composed of two blocks, that is, a connection request information saver 941, and an acquired information saver 942. The information (URL, address, etc.) of connection request from the client connected to the LAN I/F units 106-1 to 106-N of the network connection apparatus to the external network is saved in the connection request information saver 941 through the controller 102. The acquired information saver 942 saves the information downloaded automatically by the network connection apparatus on the basis of the information stored in the connection request information saver 941.

Operation of automatic downloading is explained below.

Figure 12:
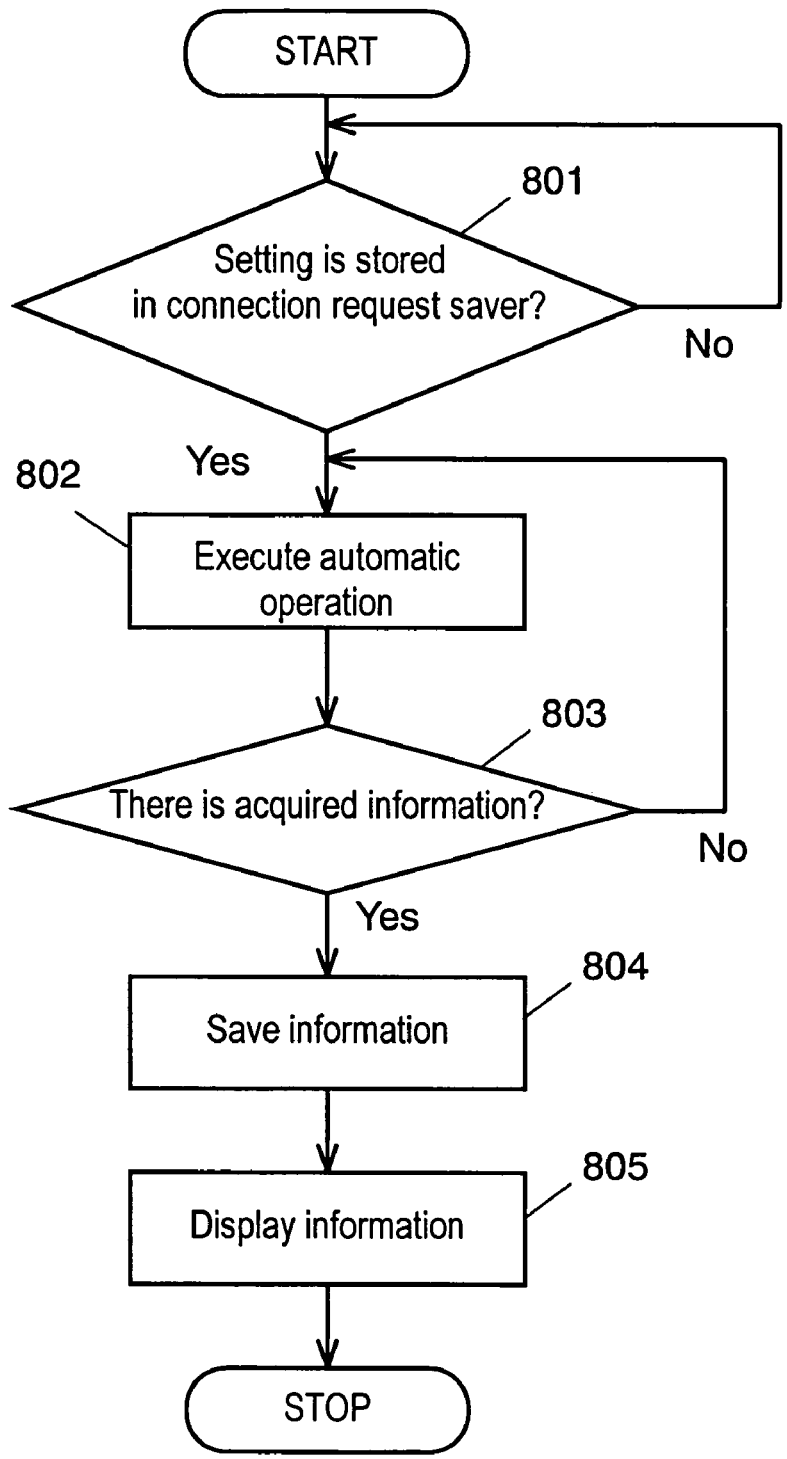
FIG. 12 is a flowchart of automatic download of the network connection apparatus in embodiment 7 of the invention.

FIG. 12 is a flowchart of automatic download of the network connection apparatus in embodiment 7 of the invention.

The flowchart shown in FIG. 12 is explained below.

<Step 801>

The manager 101 checks if information is saved in the connection request information saver 941 or not. Go to step 802 if set information is found.

<Step 802>

At a predetermined timing, execute automatic operation to acquire data automatically from the external network connected to the WAN I/F units 105-1 to 105-N. Acquire the demanded address or URL information.

<Step 803>

Check if acquired information is found or not as a result of automatic operation. If information is not acquired due to some error, return to step 802. When information is acquired, go to step 804.

<Step 804>

Save acquired data in the memory unit 104, and go to step 805.

<Step 805>

As required, presence or absence of acquired data is displayed in the display unit 103.

Accordingly, for example, the data can be automatically acquired in the time zone of low connection charge, or the data can be received without starting up the computer.

Moreover, by temporarily storing isochronous data such as audio and video in the memory unit 104, the user can reproduce the data without having effects of data delay due to communication.

Embodiment 8

Figure 13:
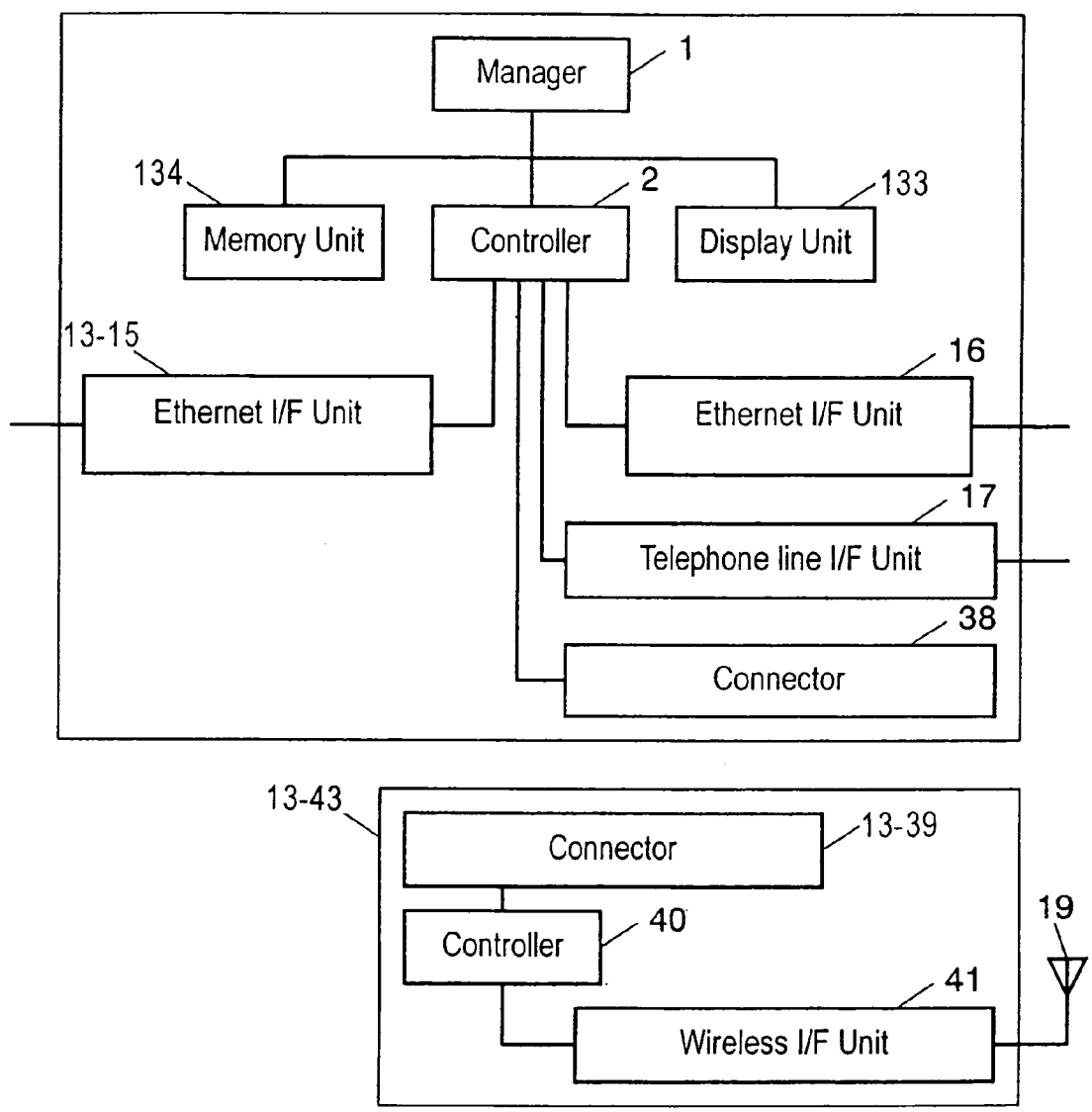
FIG. 13 is a block diagram of a network connection apparatus in embodiment 8 of the invention.

FIG. 13 is a block diagram of a network connection apparatus in embodiment 8 of the invention. The block structure in FIG. 13 is same as in FIG. 4, and its description is omitted.

In this embodiment, the LAN I/F unit is modularized in part or in whole, and is easy to attach and detach. For example, same as in embodiment 4, a wireless LAN unit 43 is detachable, and the same operation and effect are obtained.

Figure 14:
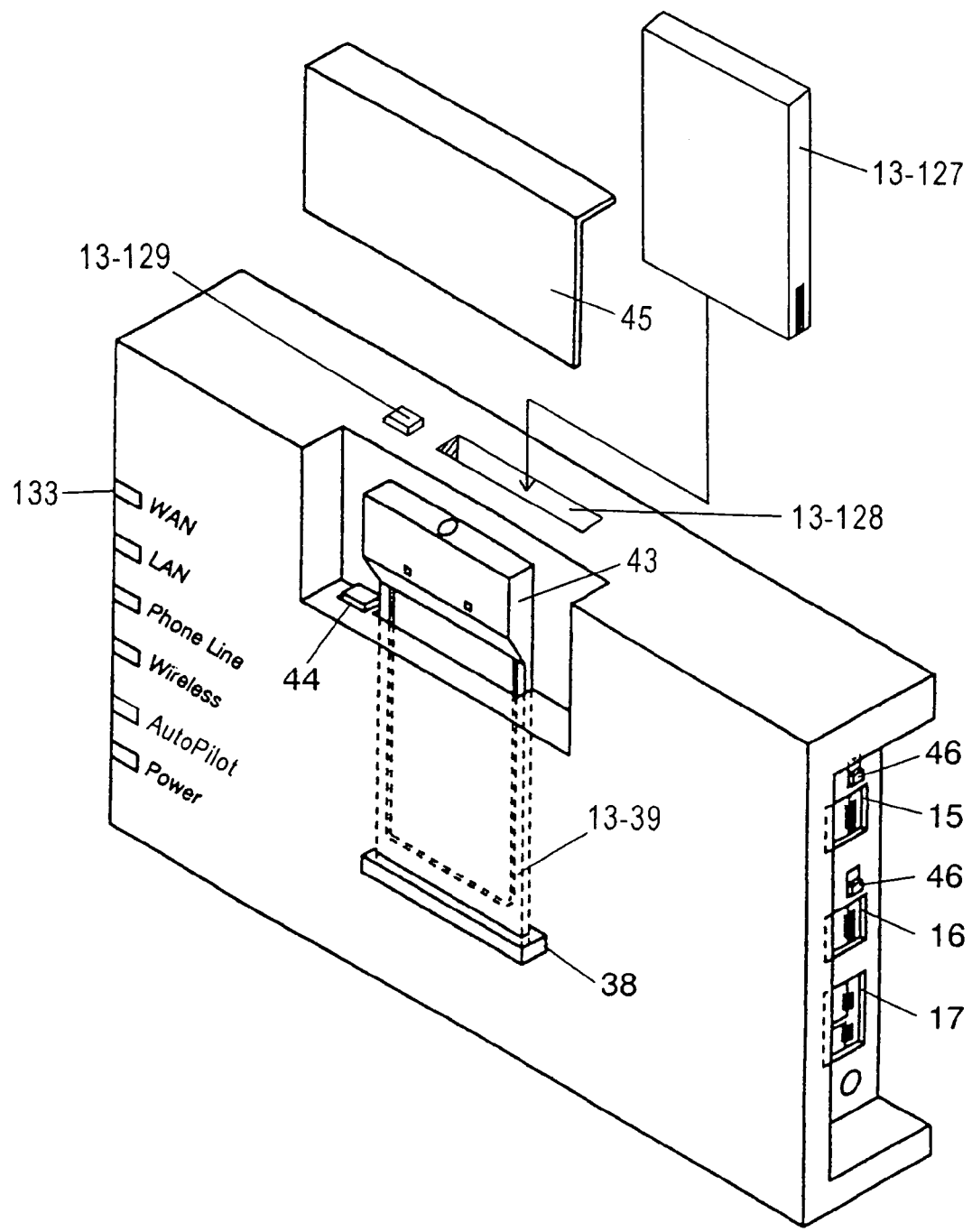
FIG. 14 is an appearance drawing of the network connection apparatus in embodiment 8 of the invention.

FIG. 14 is an appearance drawing of the network connection apparatus in embodiment 8 of the invention. Same or nearly same parts as shown in FIG. 7 are identified with same reference numerals.

A memory card 13-127 is modularized, and is detachable from the main body. The memory card 13-127 can be inserted into a memory card slot 13-128. By pressing an eject button 13-129, the inserted memory card 13-127 can be ejected from the main body.

The memory card 13-127 may include both blocks of connection request information saver 941 and acquired information saver 942 same as explained in embodiment 7. Or only the acquired information saver 942 may be provided.

In the case of the memory card 13-127 having two blocks of connection request information saver 941 and acquired information saver 942, the memory card 13-127 is inserted into the laptop PC or the like not connected to the network connection apparatus of the invention, and the information (URL, address, etc.) of connection request is written into the connection request information saver 941. Consequently, inserting into the memory card slot 13-128 of the network connection apparatus, auto-pilot is executed, and the acquired information is stored in the acquired information saver 942. Again, the card 13-127 is inserted into the laptop PC or the like not connected to the network connection apparatus, and the information can be reproduced.

In the case of the memory card 13-127 including the acquired information saver 942 only, by inserting the memory card 13-127 into other portable music reproducing device or portable video reproducing device depending on the acquired information, the information can be reproduced. In this case, since the connection request information saver 941 is not present in the memory card 13-127, more information can be stored effectively.

The memory card 13-127 may be a memory card conforming to the PC card standard. In addition, Compact-Flash card, Smart-media card, SD card and others may be properly used, and not limited to the semiconductor, but ultra-small removable hard disk drive, magneto-optical disk and others may be used.

The display unit 133 is designed to flicker during operation of each I/F. Besides, when the acquired information is stored in the memory card 127, the display unit 133 lights up. Hence, at a glance, it can be judged whether the desired information is stored in the memory card 13-127 or not. Moreover, as the display, the LCD and other display device can be used, and the display information can be increased.

As clear from the drawing, all other I/Fs than the I/F for the optional wireless LAN unit 13-43 are disposed at one side of the network connection apparatus. This is considered for the ease of bundling the connection wires used in the network, so as not to disturb the connection wires used in the network, assuming the environment of use at home or small office.

Figure 15:
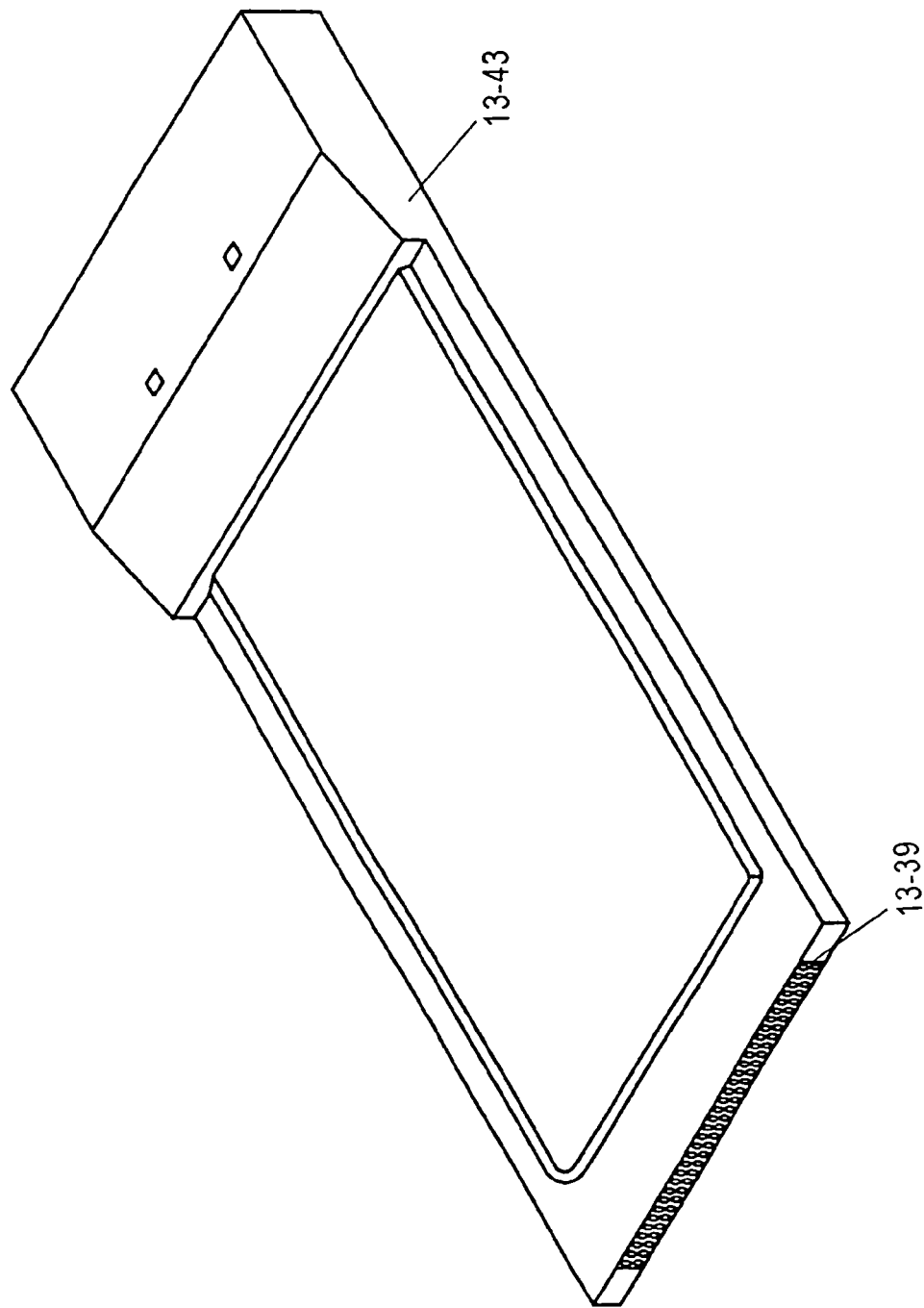
FIG. 15 is an appearance drawing of wireless LAN unit to be connected to the network connection apparatus in embodiment 8 of the invention.

FIG. 15 is an appearance drawing of wireless LAN unit to be connected to the network connection apparatus in embodiment 8 of the invention. The wireless LAN unit shown in FIG. 15 is same as the one shown in FIG. 8, and it has the same operation and effect as in embodiment 4.

In a different structure, the controller may be omitted in the wireless LAN unit 13-43.

In the invention, the LAN I/F units are not limited to only this embodiment, and the types and number of physical layers of the I/Fs are not specified.

Figure 16:
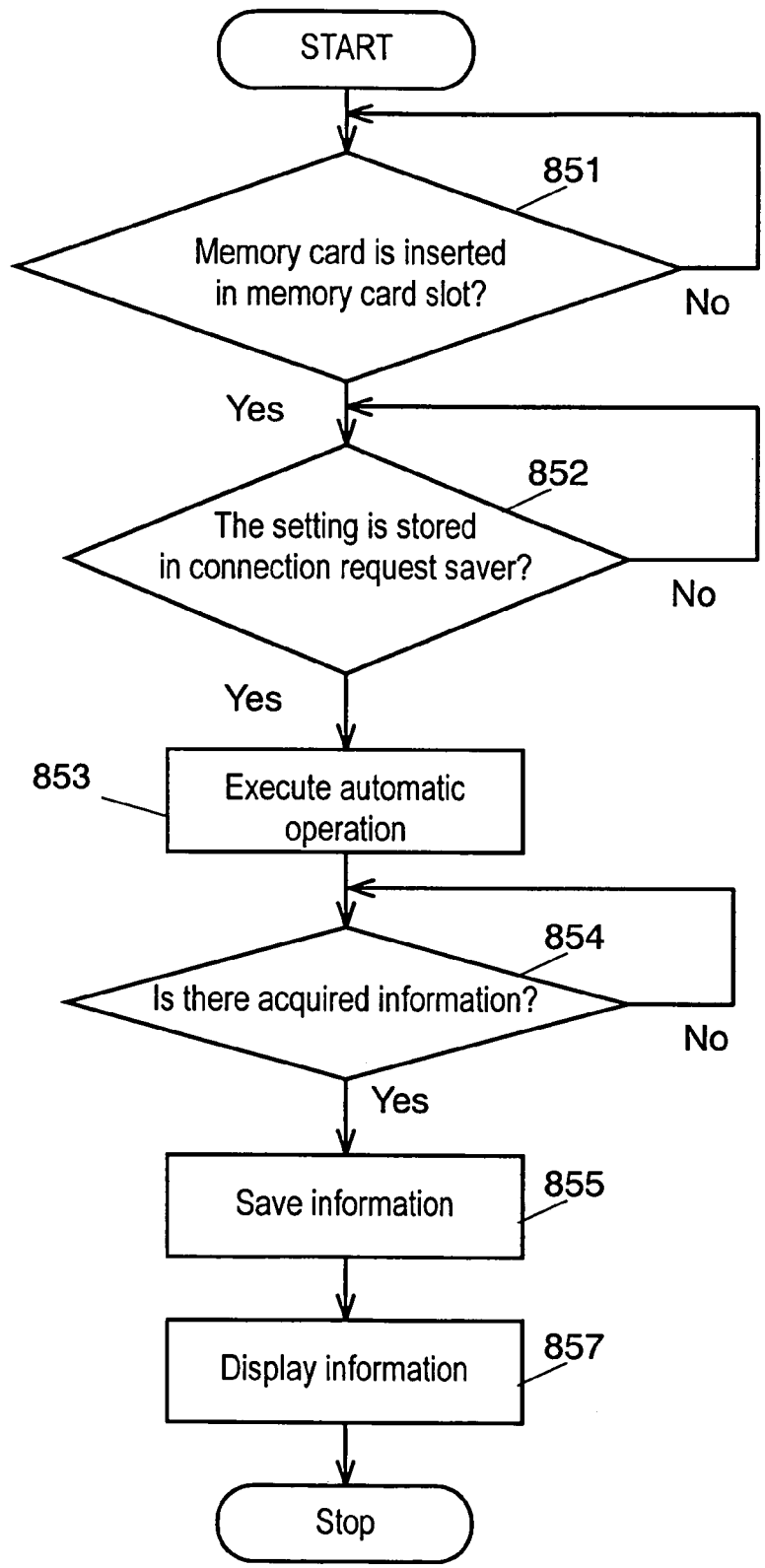
FIG. 16 is a flowchart of automatic download of the network connection apparatus in embodiment 8 of the invention.

Operation of automatic downloading is explained below. FIG. 16 is a flowchart of automatic download of the network connection apparatus in embodiment 8 of the invention.

The flowchart shown in FIG. 16 is explained below.

<Step 851>

The manager 1 checks if the memory card 13-127 is inserted in the memory card slot 13-128 or not. If inserted, go to step 852.

<Step 852>

Check if set information is saved in the connection request information saver 941 or not. If saving is confirmed, go to step 853.

<Step 853>

If information is found, at a predetermined timing, execute automatic operation to acquire data automatically from the external network connected to the WAN I/F unit 13-15. Acquire the demanded address or URL information.

<Step 854>

Check if acquired information is found or not as a result of automatic operation. If information is not acquired due to some error, return to step 853. When information is acquired, go to step 856.

<Step 855>

Save acquired data in the memory card 13-127, and go to step 856.

<Step 856>

Presence or absence of acquired data is displayed in the display unit 133.

Accordingly, for example, the data can be automatically acquired in the time zone of low connection charge, or the data can be received without starting up the computer.

Moreover, by storing data in the detachable memory card 13-127, the downloaded information can be reproduced by inserting into the portable music reproducing device or portable video reproducing device.

Embodiment 9

Figure 17:
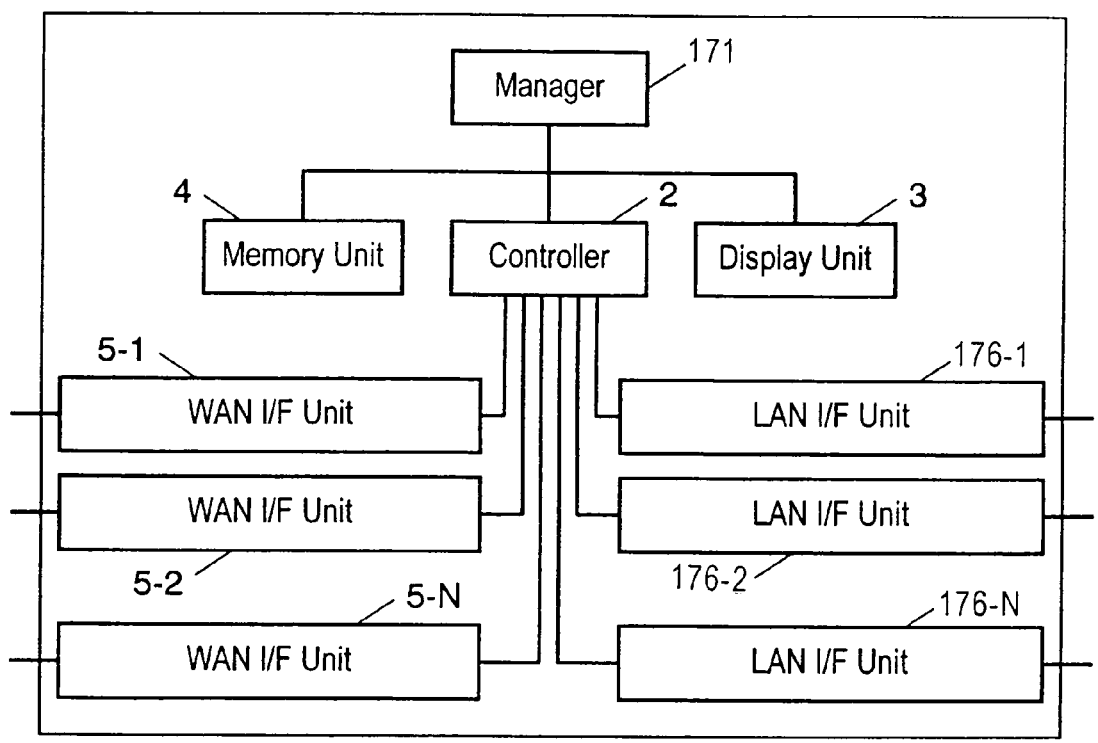
FIG. 17 is a block diagram of a network connection apparatus in embodiment 9 of the invention.

FIG. 17 is a block diagram of a network connection apparatus in embodiment 9 of the invention. The block structure in FIG. 17 is same as in FIG. 1, and its description is omitted.

The operation of the network connection apparatus in embodiment 9 is described below.

The manager 171 has a function of automatically acquiring the global IP address from an Internet service provider (ISP) connected through the WAN I/F unit. It also has a function of automatically providing the client connected to the LAN I/F units 176-1 to 176-N with the information about access such as private IP address preliminarily set in the network connection apparatus main body, sub-net mask, and gateway address. At this time, the manager 171 converts the global IP address into IP address and vice versa, so that one global IP address can be shared by plural clients connected to the LAN I/F unit 176-1 to 176-N.

Or, by varying the number of private IP addresses, the number of clients to be connected can be controlled, and the communication data quantity can be limited, so that a stable communication is realized.

As required, it also has a function of setting the global IP address acquired from the ISP directly in the client. The user can hence execute the application requiring the global IP address. If plural global IP addresses are acquired, the global IP address may be given directly to the client, or it may be shared among the connected clients.

In this case, the global IP address acquired from the ISP is usually assigned for one media access control (MAC) address. Hence, the network apparatus of the invention has a function of acquiring plural global IP addresses by automatically acquiring the MAC address of the connected client, so that it may seem that there are plural MAC addresses for the ISP.

In the invention, the LAN I/F units are not limited to this embodiment alone, and the types and number of physical layers of the I/Fs are not specified.

Embodiment 10

Figure 18:
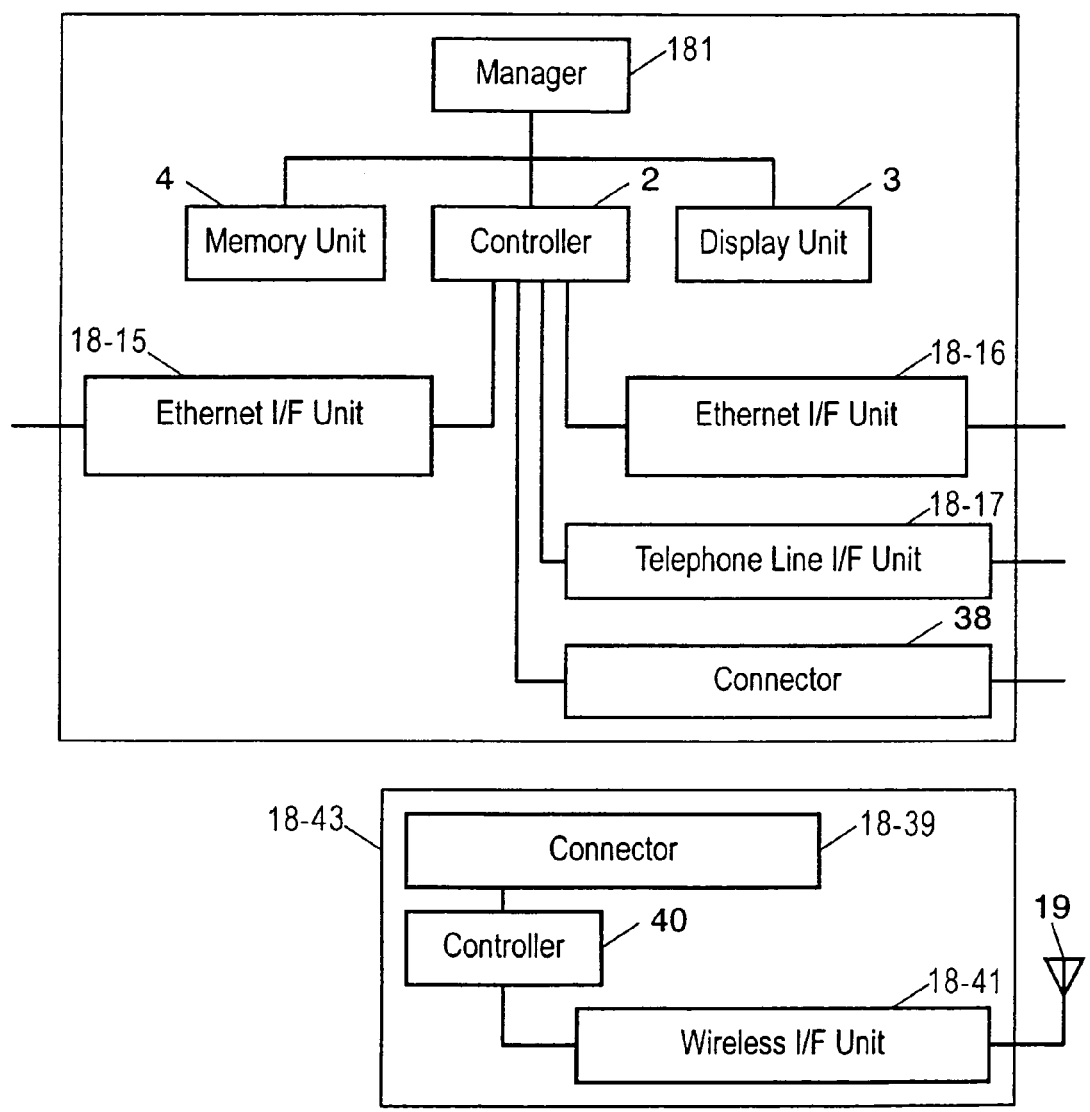
FIG. 18 is a block diagram of a network connection apparatus in embodiment 10 of the invention.

FIG. 18 is a block diagram of a network connection apparatus in embodiment 10 of the invention. The block structure in FIG. 18 is same as in FIG. 4, and has the same operation and effect as in embodiment 4.

Figure 19:
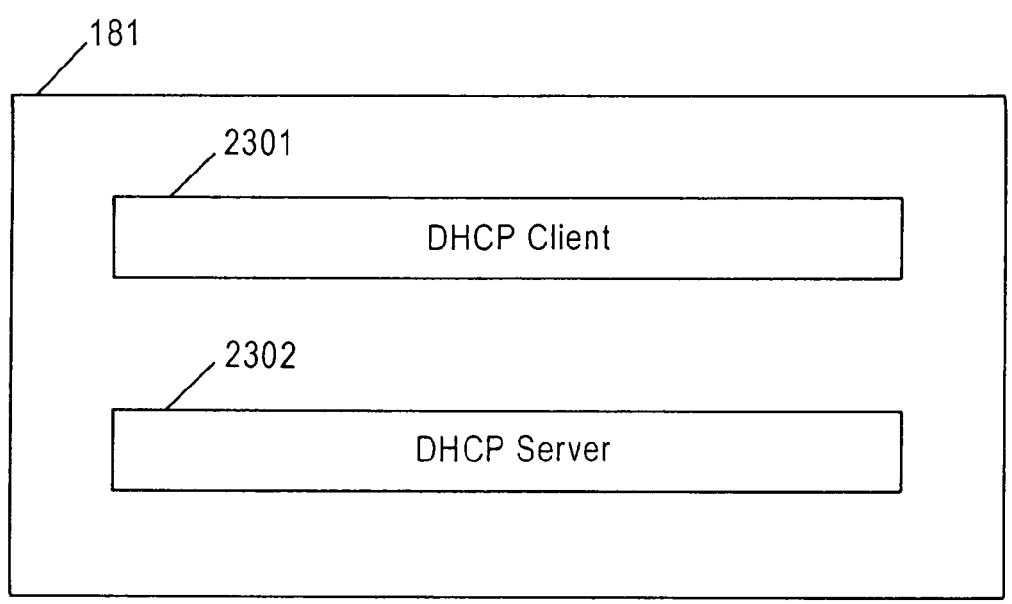
FIG. 19 is a block diagram of manager of the network connection apparatus in embodiment 10 of the invention.

FIG. 19 is a block diagram of manager 181 of the network connection apparatus in embodiment 10 of the invention.

The manager 181 in this embodiment includes DHCP client 2301 and DHCP server 2302. The DHCP client 2301 is connected to the server of the ISP (not shown) through the WAN side Ethernet I/F unit 18-15. By collaboration with the DHCP (dynamic host configuration protocol) server function that is the function in this server, the IP address is acquired automatically by accessing to the ISP.

The DHCP server 2302 is connected to the client (not shown) by way of the LAN side I/F, that is, the LAN side Ethernet I/F unit 18-16, telephone line I/F unit 18-17, and wireless I/F unit 18-41. It has the function as the DHCP server by providing this client with IP address, sub-net mask, gateway address, and other information about the access.

Figure 20:
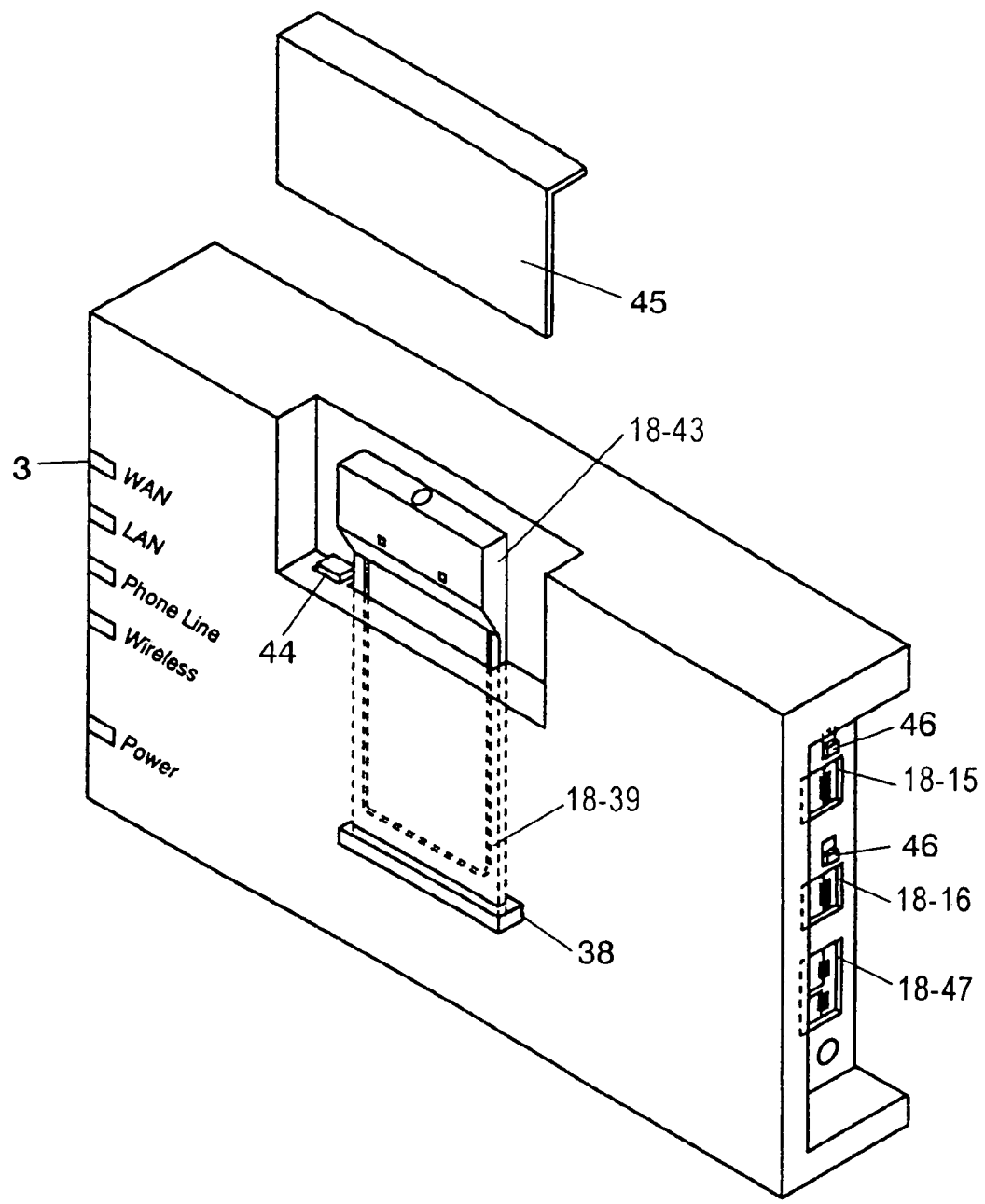
FIG. 20 is an appearance drawing of the network connection apparatus in embodiment 10 of the invention.

FIG. 20 is an appearance drawing of the network connection apparatus in embodiment 10 of the invention. The appearance of the network connection apparatus shown in FIG. 20 is same as in FIG. 7, and the operation and effect are also the same.

Figure 21:
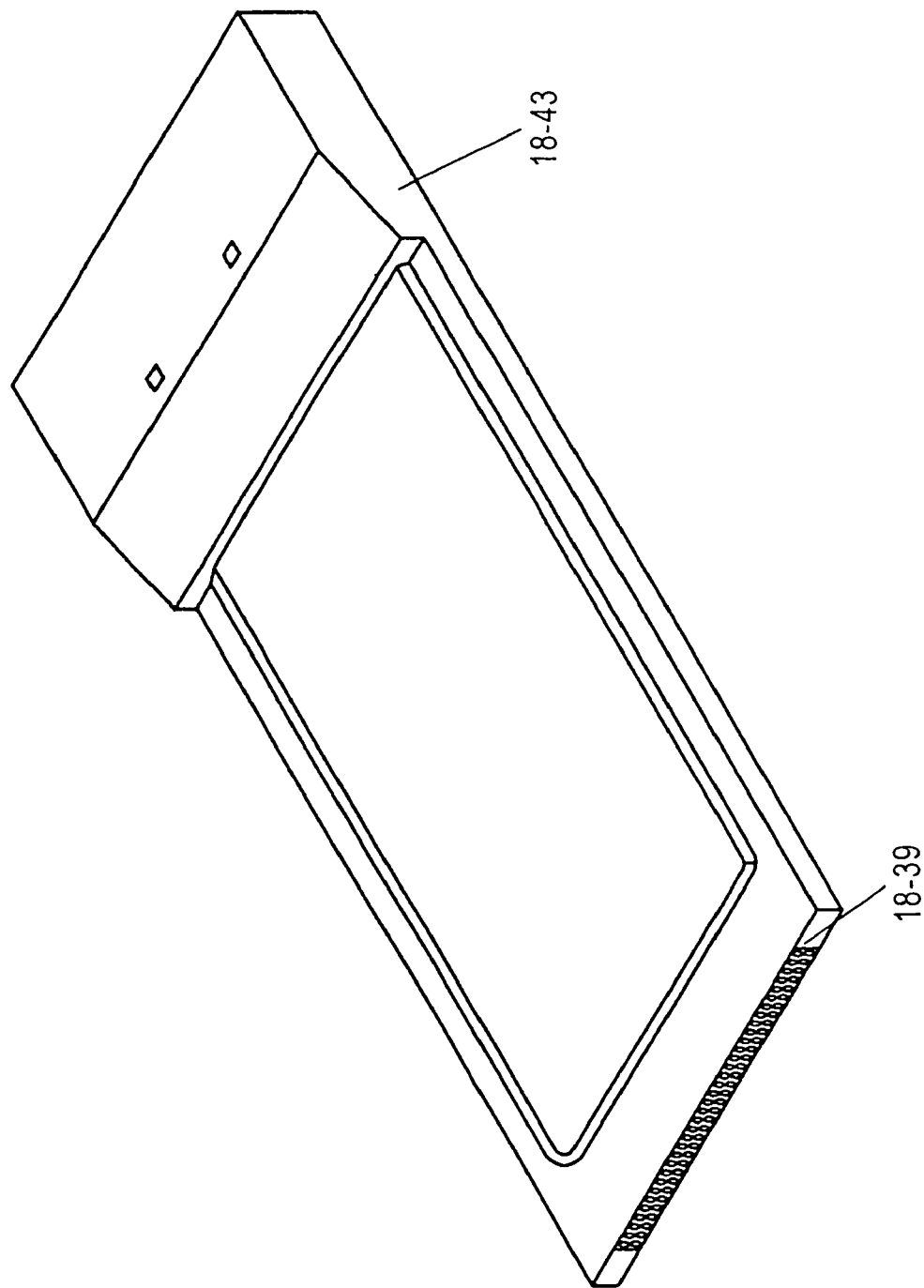
FIG. 21 is an appearance drawing of wireless LAN unit to be connected to the network connection apparatus in embodiment 10 of the invention.
Figure 22:
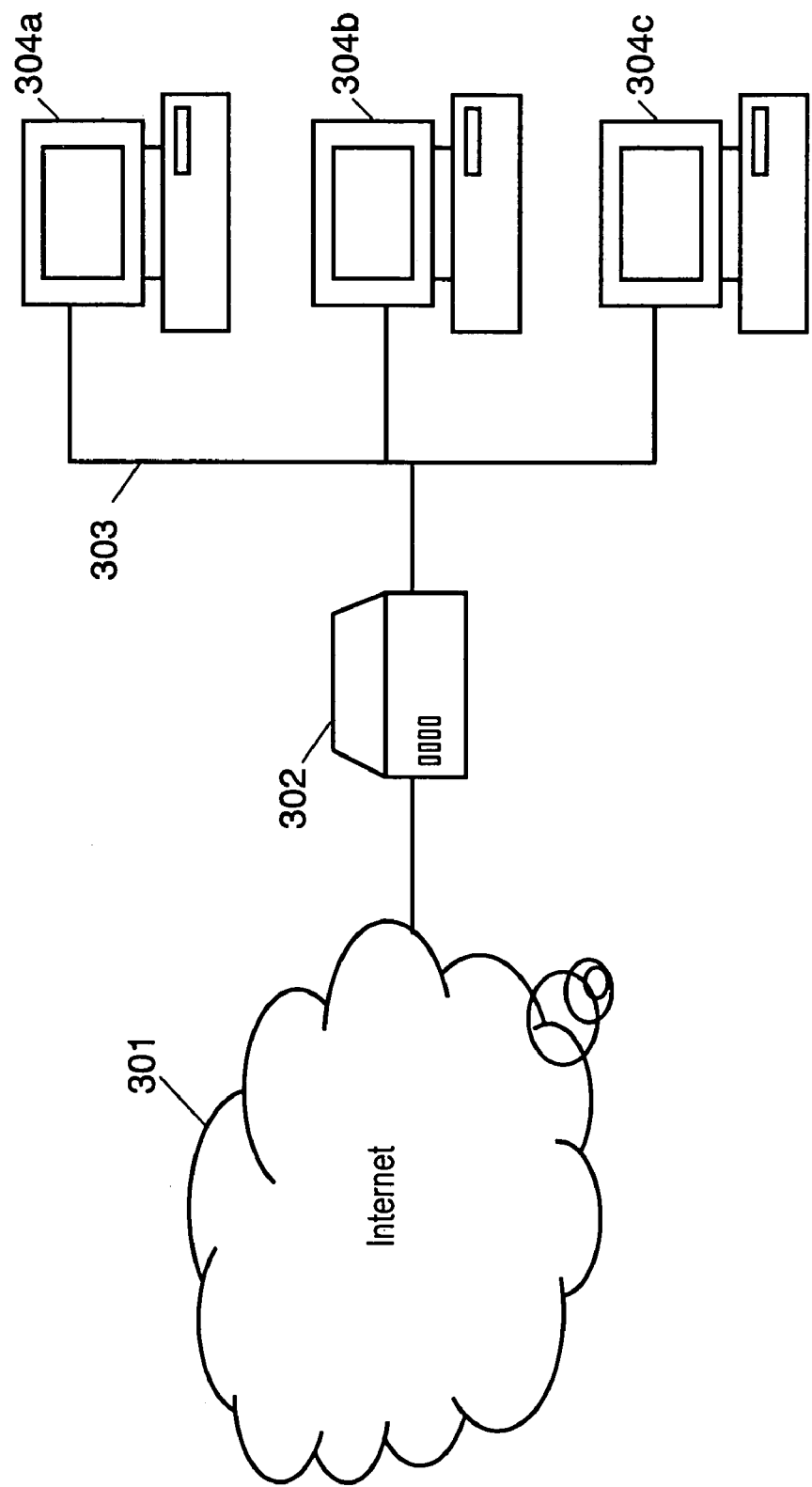
FIG. 22 is a block diagram of a conventional network system.

FIG. 21 is an appearance drawing of wireless LAN unit to be connected to the network connection apparatus in embodiment 10 of the invention. The outline of the wireless LAN unit shown in FIG. 21 is same as shown in FIG. 8, and the operation and effect are also the same.

The operation of the network connection apparatus of embodiment 10 is explained.

The DHCP client 2301 of the manager 181 automatically acquires the global IP address from the DHCP server of the ISP connected through the WAN side Ethernet I/F unit 18-15. The DHCP server 2302 of the manager 181 automatically provides the client connected through the LAN side I/F, that is, the Ethernet I/F unit 18-16, telephone line I/F unit 18-17, and wireless I/F unit 18-41, with the information about the access preliminarily set in the main body of the network connection apparatus such as private IP address, sub-net mask and gateway address. At this time, the manager 181 converts the global IP address into private IP address and vice versa, so that one global IP address can be shared by plural clients connected through the Ethernet I/F unit 18-16, telephone line I/F unit 18-17, and wireless I/F unit 18-41.

Besides, by varying the number of private IP addresses, and limiting the number of clients to be connected, the communication data quantity can be limited, so that stable communication is possible.

It has also a function of setting the global IP address acquired from the ISP as required, directly to the connected client. The user can execute the application requiring the global IP address. If plural global IP addresses are acquired, the global IP address may be directly given to the client, or it may be shared by connected clients.

In this case, usually, the global IP address acquired from the ISP is assigned to one MAC address. Hence, the network connection apparatus of the invention has a function of acquiring plural global IP addresses by automatically acquiring the MAC address of the connected client, so that it may appear that there are plural MAC addresses for the ISP.

In the invention, the LAN I/F unit are not limited to only this embodiment, and the types and number of physical layers of the I/Fs are not specified.

According to the invention, as described herein, it comprises a first interface including at least one physical layer for connecting to an external network, a second interface including plural physical layers for connecting to an internal network, and a controller for controlling the first interface and second interface. The controller transmits and receives information at least between the first interface and second interface, or between the second interfaces. Accordingly, it is applicable to the interface for connecting to an external network, and plural types of interface about an internal network, so that an easy and flexible network system can be built up.

Isochronous information such as video and audio can be smoothly transmitted and received.

When transmitting and receiving information in the internal network, it can be used without any sense of strangeness.

By modularizing the second interface, the interface necessary for connecting various information appliances at home can be prepared only when necessary, and such flexible use is possible. A necessary LAN interface unit can be selected. Further, an expensive interface such as wireless LAN unit is used only optionally, so that the cost of the main body of the network connection apparatus can be saved.

Further, by modularizing according to the PC card standard, the modularized interface unit can be used in the device having a PC card slot, such as a laptop computer, so that the versatility is enhanced.

According to the invention, further comprising the acquired information saver for saving the information acquired from the external network, the controller can transmit and receive information between the first interface unit and second interface unit, and between the second interface units, and also controls to acquire desired information by accessing the external network through the first interface unit, and save in the acquired information saver. Hence the information once acquired can be reproduced, reviewed and checked later.

Further comprising the connection request information saver for saving the connection request information from the client connected to the second interface unit, regardless of connection of the client, the desired information can be acquired by accessing the external network through the first interface unit, and accordingly, for example, the data can be automatically acquired in the time zone of low connection charge, or the data can be received without starting up the computer.

Moreover, by storing the downloaded information in the memory card, by inserting into portable music reproducing device or portable video reproducing device depending on the acquired information, the information can be reproduced.

Also according to the invention, comprising also the access information applying means for providing the client connected to the second interface unit with the information about the access, the controller provides the client with the access information by the access information applying means when it is recognized that the client is connected to the second interface unit. Hence, the terminal connected to the network connection apparatus is automatically provided with the access information, so that the network can be built up easily without requiring any complicated setting operation.

What is claimed is:

1. A network connection apparatus comprising:
   at least one external interface unit including at least one physical layer for connecting to an external network,
   a first internal interface unit including a first type of physical layer for connecting to an internal network,
   a second internal interface unit including a second type of physical layer, which is different from said first type of physical layer, for connecting to the internal network, and
   a controller for controlling said at least one external interface unit, and said first and second internal interface units,
   wherein one of said first and second internal interface units is capable of independent operation from said at least one external interface unit, and
   said controller transmits and receives information between said first and second internal interface units,
   wherein said network connection apparatus further comprises:
   an access information acquiring unit for acquiring information about first access from an Internet service provider connected through said at least one external interface unit, and an access information applying unit for providing a client connected to one of said first and second internal interface units with information about second access,
   wherein said controller further acquires the information about first access from said access information acquiring unit when it is recognized that said at least one external interface unit is connected to the Internet service provider, and provides said client with the information about second access by said access information applying unit when it is recognized that the client is connected to one of said first and second internal interface units.

2. The network connection apparatus of claim 1, wherein said access information acquiring unit acquires the information about access from said Internet service provider, relating to media access control (MAC) address of the client connected to one of said first and second internal interface units.

3. The network connection apparatus of claim 1 or 2, wherein the information about first access is a first IP address, and the information about second access is a second IP address.

4. The network connection apparatus of claim 3, wherein the number of second IP addresses is variable, and the number of connected clients is controlled.

5. The network connection apparatus of claim 3, further comprising an IP address varying unit for translating said first IP address and second IP address.

6. The network connection apparatus of claim 4, further comprising an IP address varying unit for translating said first IP address and second IP address.

* * * * *